(12) United States Patent
Leung et al.

(10) Patent No.: US 6,895,488 B2
(45) Date of Patent: May 17, 2005

(54) DSP MEMORY BANK ROTATION

(75) Inventors: Ho-Ming Leung, Cupertino, CA (US); Wern-Yan Koe, Cupertino, CA (US); Fan Zhang, San Jose, CA (US); Kasturiranga N. Rangam, Santa Clara, CA (US); Venkatesh Balasubramanian, Santa Clara, CA (US)

(73) Assignee: LSI Logic Corporation, Milpitas, CA (US)

( * ) Notice: Subject to any disclaimer, the term of this patent is extended or adjusted under 35 U.S.C. 154(b) by 363 days.

(21) Appl. No.: 10/153,090

(22) Filed: May 22, 2002

(65) Prior Publication Data

US 2003/0221045 A1 Nov. 27, 2003

(51) Int. Cl.[7] ............................................. G06F 12/00
(52) U.S. Cl. ..................... 711/202; 711/5; 711/105; 711/154; 711/157; 711/211; 711/220; 365/230.03
(58) Field of Search ........................... 711/5, 105, 154, 711/157, 211, 202, 220; 365/230.03

(56) References Cited

U.S. PATENT DOCUMENTS

| 4,493,027 | A | * | 1/1985 | Katz et al. ................... 712/228 |
|---|---|---|---|---|
| 4,633,434 | A | * | 12/1986 | Scheuneman ................ 713/400 |
| 4,888,687 | A | * | 12/1989 | Allison et al. .................. 711/5 |
| 4,894,770 | A | * | 1/1990 | Ward et al. .................. 711/128 |
| 4,930,066 | A | * | 5/1990 | Yokota ........................ 711/149 |
| 5,269,010 | A | * | 12/1993 | MacDonald .................... 711/5 |
| 5,835,963 | A | * | 11/1998 | Yoshioka et al. ............ 711/207 |
| 5,924,111 | A | * | 7/1999 | Huang et al. .................... 711/5 |
| 6,215,719 | B1 | * | 4/2001 | Anraku .................. 365/230.03 |
| 6,289,429 | B2 | * | 9/2001 | Okamoto ..................... 711/202 |
| 6,356,991 | B1 | * | 3/2002 | Bauman et al. ............. 711/209 |
| 6,381,668 | B1 | * | 4/2002 | Lunteren ........................ 711/5 |
| 6,553,478 | B1 | * | 4/2003 | Grossier ...................... 711/209 |
| 2003/0140305 | A1 | * | 7/2003 | Gatherer et al. ............ 714/794 |

* cited by examiner

*Primary Examiner*—Stephen Elmore
(74) *Attorney, Agent, or Firm*—Christopher P. Maiorana, P.C.

(57) ABSTRACT

An apparatus comprising a memory, a plurality of modules, an address translation unit and a controller. The memory may be arranged as a plurality of memory banks. Each of the plurality of modules may be configured to generate one or more addresses for accessing a particular one of the plurality of memory banks. The address translation unit may be configured to modify the one or more addresses in response to a control signal. The controller may be configured to generate the control signal in response to a computer executable instruction.

20 Claims, 5 Drawing Sheets

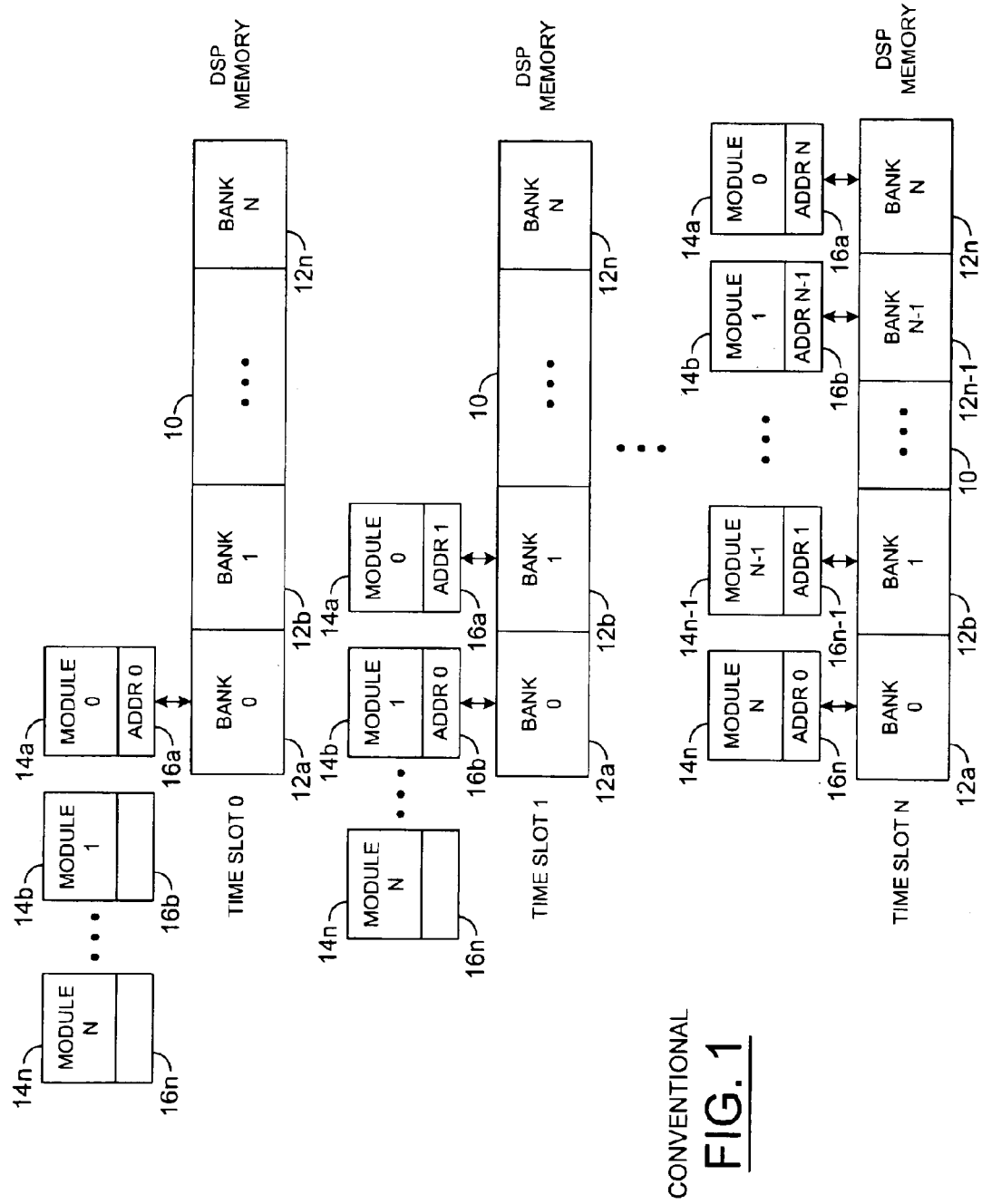
CONVENTIONAL
FIG. 1

DSP MEMORY BANK ROTATION

FIELD OF THE INVENTION

The present invention relates to a method and/or architecture for performing memory bank swapping generally and, more particularly, to a method and/or architecture for digital signal processing (DSP) memory bank rotation.

BACKGROUND OF THE INVENTION

Referring to FIG. 1, a block diagram illustrating a conventional digital signal processing (DSP) operation is shown. A DSP memory 10 can be divided into a number of memory banks 12a–12n. There can also be a number of modules 14a–14n that access the memory 10. Each module 14a–14n has a memory address bus 16a–16n, respectively, that presents addresses for accessing the memory 10. The upper bits of the address busses 16a–16n determine which memory bank 12a–12n a particular one of the modules 14a–14n accesses.

Conventionally, DSP operations occur in a pipeline fashion. The DSP operations are divided into N pipeline stages, with each module 14a–14n working on one pipeline stage at one time. For example, a module 14j accesses a memory bank 12i in one particular time slot and in the next time slot, the module 14j accesses a memory bank 12(i+1) and so on.

Each module 14a–14n (i.e., the software or firmware) needs to keep track of the current time slot and program the memory address (i.e., bank number) accordingly. Keeping track of the current time slot and programming the memory address increases software overhead and can degrade system performance.

SUMMARY OF THE INVENTION

The present invention concerns an apparatus comprising a memory, a plurality of modules, an address translation unit and a controller. The memory may be arranged as a plurality of memory banks. Each of the plurality of modules may be configured to generate one or more addresses for accessing a particular one of the plurality of memory banks. The address translation unit may be configured to modify the one or more addresses in response to a control signal. The controller may be configured to generate the control signal in response to a computer executable instruction.

The objects, features and advantages of the present invention include providing a method and/or architecture for DSP memory bank rotation that may (i) synchronize DSP operations with one instruction, (ii) eliminate interrupts and the associated overhead, (iii) allow simultaneous access, (iv) widen the access window for direct memory access (DMA), and/or (v) minimize impact on synchronous dynamic random access memory (SDRAM) latency.

BRIEF DESCRIPTION OF THE DRAWINGS

These and other objects, features and advantages of the present invention will be apparent from the following detailed description and the appended claims and drawings in which:

FIG. 1 is a block diagram illustrating operation of a conventional digital signal processor;

DETAILED DESCRIPTION OF THE PREFERRED EMBODIMENTS

Figure 2:
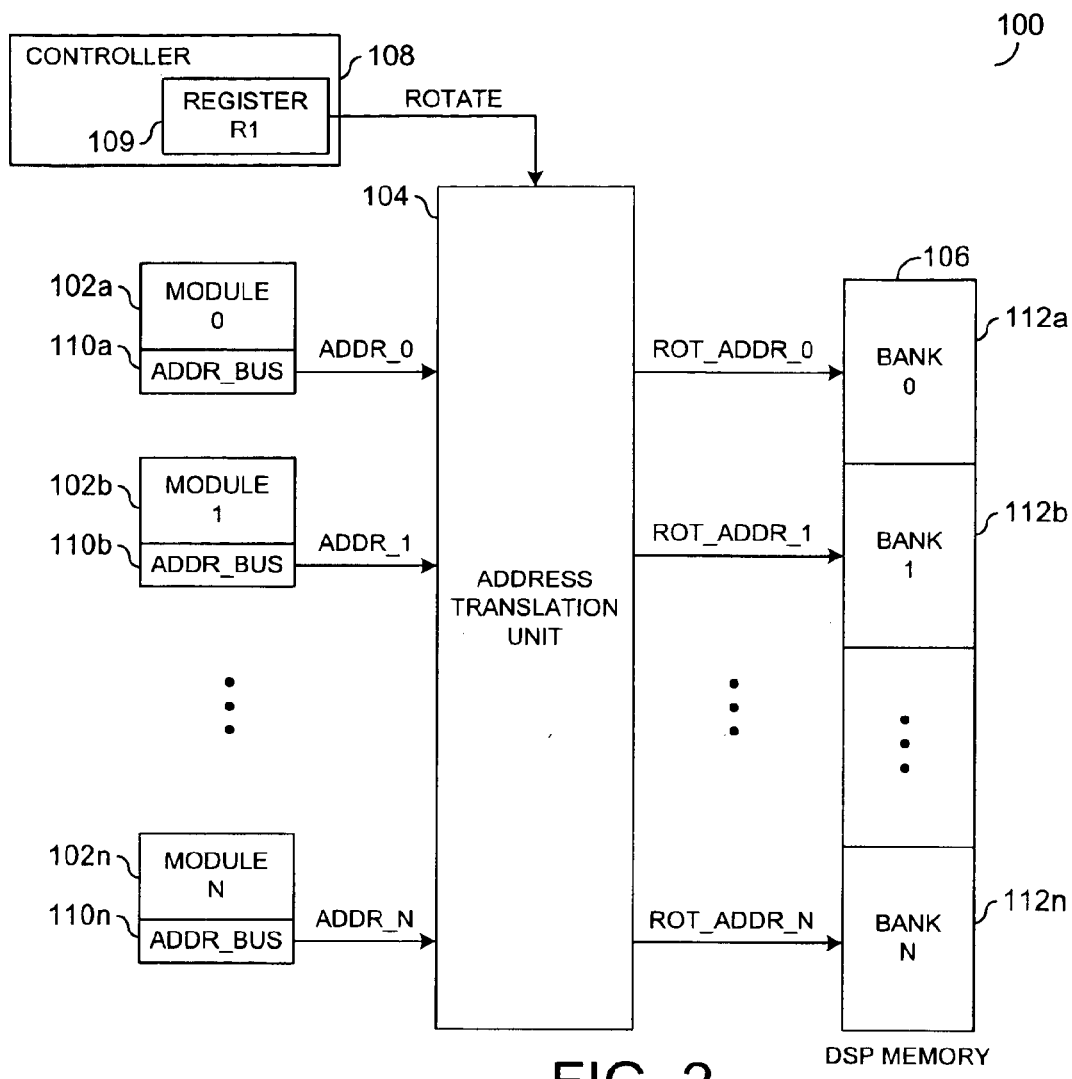
FIG. 2 is a block diagram of a preferred embodiment of the present invention.

Referring to FIG. 2, a block diagram of a system (architecture) 100 is shown in accordance with a preferred embodiment of the present invention. The system 100 may be implemented, in one example, as a digital signal processor (DSP). The system 100 may be implemented in hardware, firmware, software, and/or any combination thereof. The circuit 100 may be implemented to perform, for example, real time computation or intensive data processing in systems such as modems, digital audio equipment, digital cellular communication systems, etc. The circuit 100 may comprise a number of modules 102a–102n, an address translation unit (block) 104, a memory 106 and a controller 108.

Each of the modules 102a–102n may comprise an address bus 110a–110n that may be configured to generate (present) addresses for accessing a respective memory bank 112a–112n of the memory 106. Each of the busses 110a–110n may communicate a respective address (e.g., ADDR_0-ADDR_N) to the address translation block 104. The address translation block 104 may be configured to generate translated addresses (e.g., ROT_ADDR_0-ROT_ADDR_N) in response to the addresses ADDR_0-ADDR_N and a signal (e.g., ROTATE). In one example, the address translation block 104 may be configured to perform a modular addition between each of the addresses ADDR_0-ADDR_N and the signal ROTATE. However, other logical and/or arithmetic operations may be implemented accordingly to meet the design criteria of a particular application. The addresses ROT_ADDR_0-ROT_ADDR_N may be presented to the memory 106.

The signal ROTATE may be implemented, in one example, as a predetermined rotation value. By modifying the addresses ADDR_0-ADDR_N based on the signal ROTATE, each of the addresses ADDR_0-ADDR_N generally access a different one of the memory banks 112a–112n for a different value of the signal ROTATE. By changing the value of the signal ROTATE, the system 100 may rotate the memory banks 112a–112n among the modules 102a–102n without the addresses ADDR_0-ADDR_N being changed. Therefore, the signal ROTATE may determine which of the banks 112a–112n is accessed by each of the modules 102a–102n during a particular time slot.

The controller 108 may be configured to generate the signal ROTATE in response to a computer executable instruction (e.g., a new processor machine instruction swapDSP). For example, the controller 108 may be configured to present a predetermined value stored in a register 109 to the address translation unit 104 in response to the computer executable instruction. However, the predetermined value may also be stored in memory. The predetermined value may be implemented to represent a rotation amount for swapping the memory banks 112a–112n from one time slot to a subsequent time slot.

The system 100 may be configured to modify the addresses ADDR_0-ADDR_N in response to the signal ROTATE in order to swap (rotate) the memory banks 112a–112n accessed by each of the modules 102a–102n. In general, the circuit 104 is configured to modify a portion of the addresses ADDR_0-ADDR_N that determines which of the banks 112a–112n each module accesses. As the signal ROTATE changes with each time slot, a different bank 112a–112n of the memory 106 is accessed by a particular module 102a–102n while the bank determining portion of the respective addresses ADDR_0-ADDR_N generally remains unchanged from one time slot to another.

In one example, the rotation amount may be provided by the new processor machine instruction swapDSP. The computer executable instruction may be implemented, in one example, as follows:

swapDSP %r1, where r1 represents, in one example, the register 109. The register 109 may contain a number from, for example, 1 to 0xf that is generally the amount by which to rotate the memory banks 112a–112n. Alternatively, r1 may represent a memory location.

The software design of the system 100 may be simplified with the new instruction. For example, the swapDSP instruction may specify how the addresses ADDR_0-ADDR_N may be translated to a physical bank number. In general, when the new instruction is implemented, the software of each module 102a–102n may operate without keeping track of the current time slot. In each time slot, the bank address of a particular module generally does not change. For example, a module 102j may continue using a memory bank address A while a module j+1 continues to use a memory bank address B at every time slot. At the beginning of each time slot, the computer executable instruction swapDSP may be executed to map each bank address of the modules 102a–102n to an actual bank of the memory 106. In an example application with 4 memory banks and 4 modules, the actual memory bank may be related to the module as shown in the following TABLE 1:

TABLE 1

| time slot | module 0 | module 1 | module 2 | module 3 |
|---|---|---|---|---|
| 0 | bank 0 | bank 1 | bank 2 | bank 3 |
| 1 | bank 1 | bank 2 | bank 3 | bank 0 |
| 2 | bank 2 | bank 3 | bank 0 | bank 1 |
| 3 | bank 3 | bank 0 | bank 1 | bank 2 |
| 4 | bank 0 | bank 1 | bank 2 | bank 3 |
| 5 | bank 1 | bank 2 | bank 3 | bank 0 |

Figure 3:
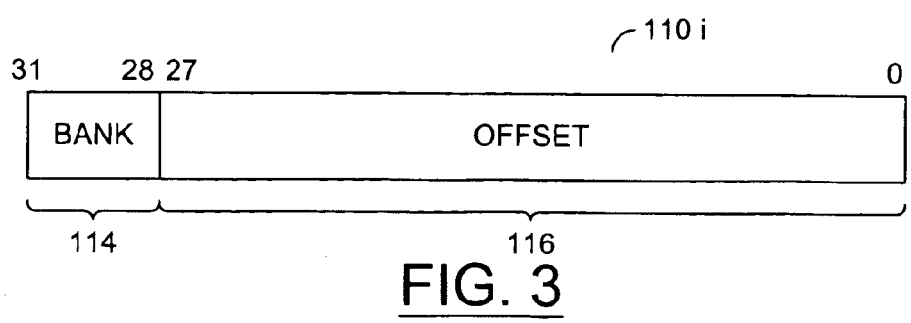
FIG. 3 is a block diagram of an example module address bus configuration of FIG. 2.

Referring to FIG. 3, a block diagram of an example address bus 110i is shown. The address busses 110a–110n may comprise a number of bits. In one example, the busses 110a–110n may be implemented as 32-bit wide busses. However, other sizes of busses may be implemented accordingly to meet the design criteria of a particular application. A number of the most significant bits of an address bus 110 (e.g., a portion 114) may be configured to select the bank 112a–112n to be accessed. The remaining bits (e.g., a portion 116) may comprise an offset. In one example, the address bits 31:28 may be configured to select one of the memory banks 112a–112n, while the address bits 27:0 select an offset location within the particular bank selected.

Figure 4:
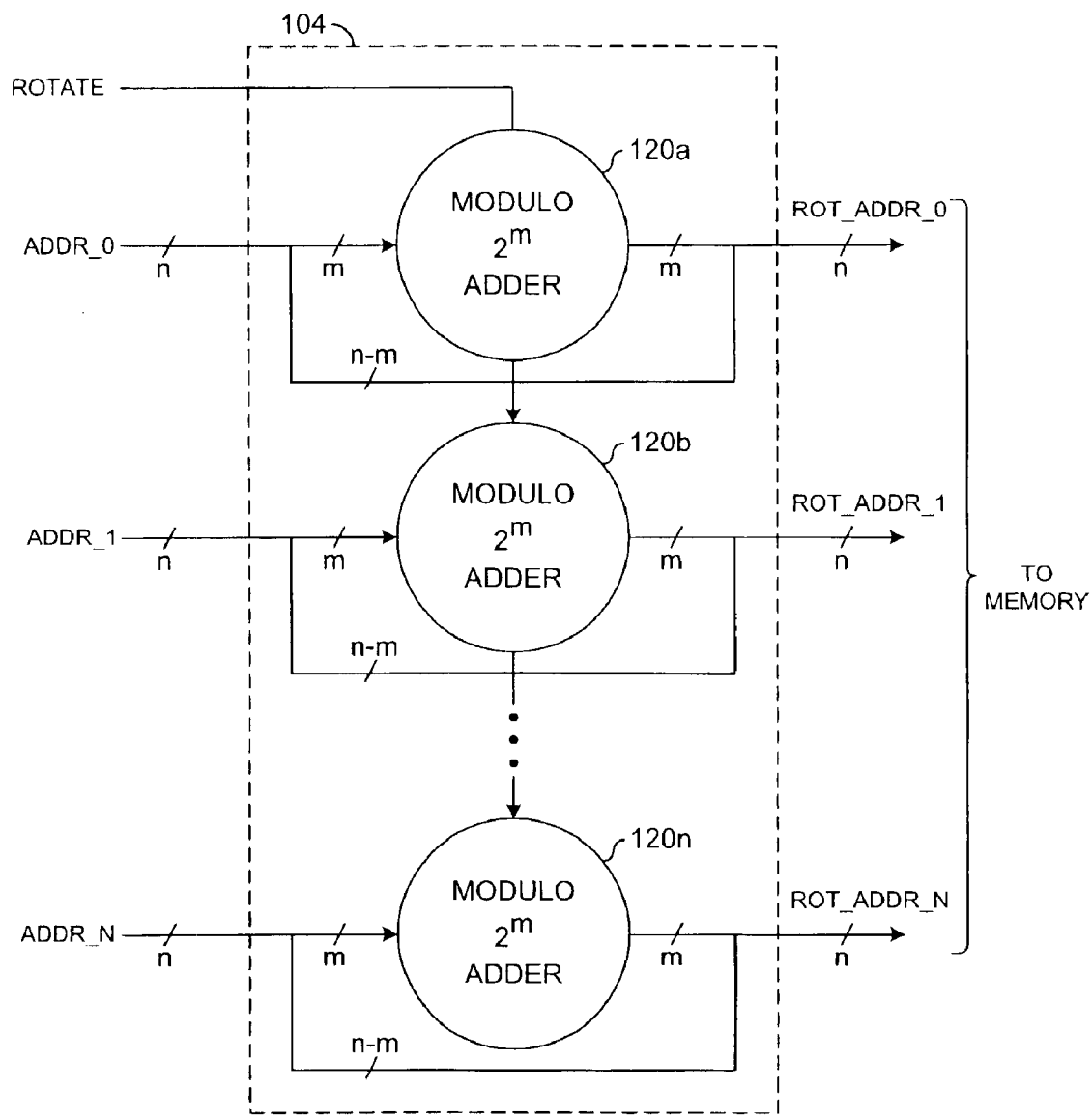
FIG. 4 is a more detailed block diagram of an address translation block of FIG. 2.

Referring to FIG. 4, a more detailed block diagram of the address translation block 104 of FIG. 2 is shown. The address translation block 104 may comprise a number of adders 120a–120n. In one example, the adders may be implemented as modulo $2^M$ adders, where M is the number of bits that determined the bank to be accessed. Each of the adders 120a–120n may have a first input that may receive the signal ROTATE and a second input that may receive, in one example, M of the most significant bits of a respective one of the addresses ADDR_0-ADDR_N. The adders 120a–120n may be configured to add the M bits of the respective addresses with the value ROTATE to generate a physical bank number for accessing the memory 106. A modulus function is generally applied to the sum of the M bits of the respective address and the value ROTATE. For example, where the upper four address bits (e.g., ADDR_0[31:28]) are used to select the bank to be accessed, the output of the adder may be modulo divided by 16 (e.g., 0xf+0x1=0x, 0xf+0x2=0x1, etc.). The modified M bits and the unmodified N-M bits of the respective addresses ADDR_0-ADDR_N are generally presented to the memory 106 as the respective translated addresses ROT_ADDR_0-ROT_ADDR_N. Other logical and/or arithmetic operations may be implemented accordingly to meet the design criteria of a particular application.

Figure 5:
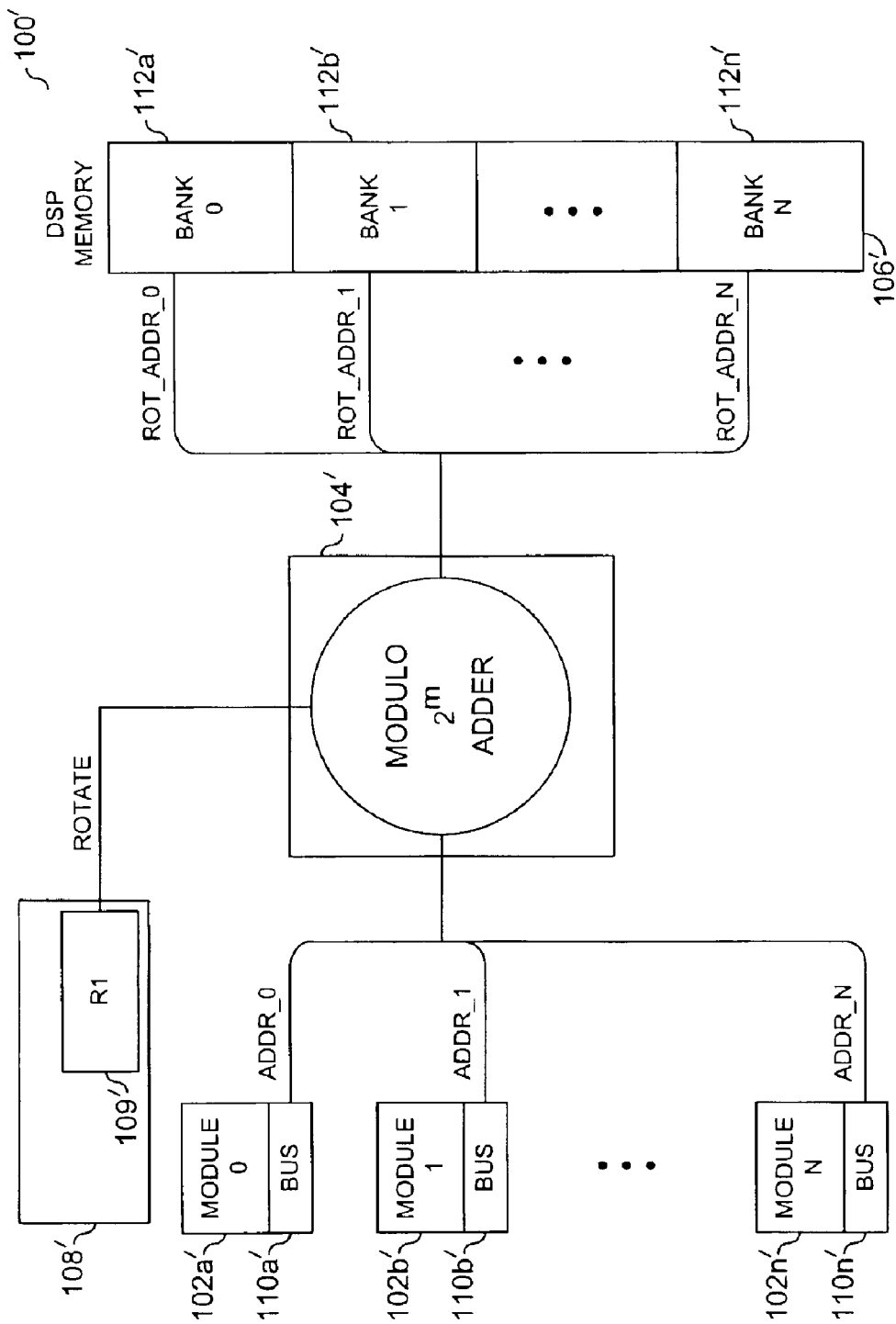
FIG. 5 is a block diagram of an alternative embodiment of the present invention.

Referring to FIG. 5, a block diagram of a system 100' in accordance with an alternative embodiment of the present invention is shown. The address translation unit 104 may be implemented as a single adder. The addresses ADDR_0-ADDR_N may be, in one example, time division multiplexed on a single bus between the modules 102a–102n and the address translation unit 104. The translated addresses ROT_ADDR_0-ROT_ADDR_N may be time division multiplexed on a single bus between the address translation unit 104 and the memory 106.

Figure 6:
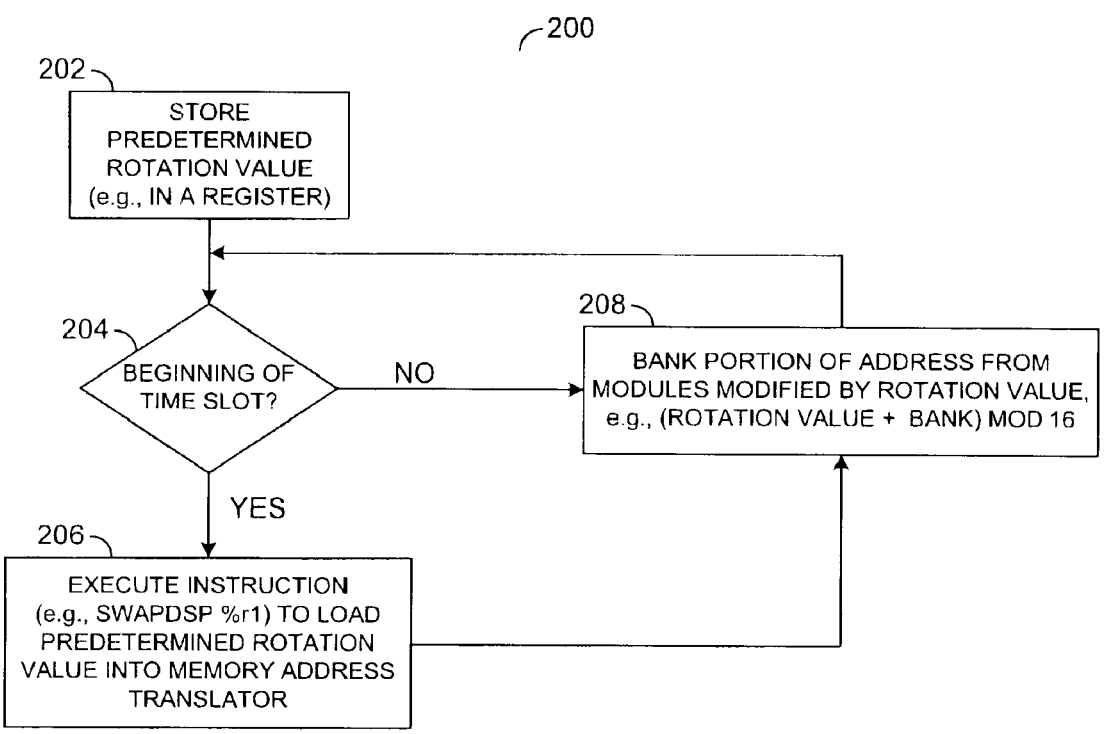
FIG. 6 is a flow diagram of an example operation of the present invention.

Referring to FIG. 6, a flow diagram of a process 200 is shown illustrating an example operation in accordance with a preferred embodiment of the present invention. Upon initialization, a predetermined rotation value may be stored in a digital signal processor register (e.g., R1) or memory (e.g., the block 202). The operations of the digital signal processor may be divided into a number of time slots. At the beginning of each time slot, an instruction, for example, swapDSP %r1 may be executed. The instruction swapDSP %r1 may be implemented to load the predetermined rotation value from the register R1 (or other storage location) into the address translation block 104 (e.g., the blocks 204 and 206). During the operation of each module during a time slot, the address translation block may be configured to modify a portion of each address containing memory bank information (e.g., the blocks 204 and 208). For example, the address translation unit may be configured to add the predetermined rotation value to the portion of the address that selects the memory bank used by the module. A modulus function may be applied to prevent generation of an invalid bank address and allow the addresses to wrap around to the first bank from the last bank.

The function performed by the flow diagram 200 of FIG. 6 may be implemented using a conventional general purpose digital computer programmed according to the teachings of the present specification, as will be apparent to those skilled in the relevant art(s). Appropriate software coding can readily be prepared by skilled programmers based on the teachings of the present disclosure, as will also be apparent to those skilled in the relevant art(s).

The present invention may also be implemented by the preparation of ASICs, FPGAs, or by interconnecting an appropriate network of conventional component circuits, as is described herein, modifications of which will be readily apparent to those skilled in the art(s).

The present invention thus may also include a computer product which may be a storage medium including instructions which can be used to program a computer to perform a process in accordance with the present invention. The storage medium can include, but is not limited to, any type of disk including floppy disk, optical disk, CD-ROM, and magneto-optical disks, ROMs, RAMs, EPROMs, EEPROMs, Flash memory, magnetic or optical cards, or any type of media suitable for storing electronic instructions.

As used herein, the term "simultaneous" is meant to describe events that share some common time period but the term is not meant to be limited to events that begin at the same point in time, end at the same point in time, or have the same duration.

While the invention has been particularly shown and described with reference to the preferred embodiments thereof, it will be understood by those skilled in the art that various changes in form and details may be made without departing from the spirit and scope of the invention.

We claim:

1. An apparatus comprising:
   a memory arranged as a plurality of memory banks;
   a plurality of modules each configured to generate one or more addresses for accessing a particular one of said plurality of memory banks;
   an address translation unit configured to modify said one or more addresses in response to a control signal; and
   a controller configured to generate said control signal in response to a computer executable instruction.

2. The apparatus according to claim 1, wherein said apparatus comprises a digital signal processor.

3. The apparatus according to claim 1, further comprising a storage element configured to store a predetermined value.

4. The apparatus according to claim 3, wherein said storage element comprises a register.

5. The apparatus according to claim 3, wherein said controller is configured to transfer said predetermined value to said address translation unit via said control signal.

6. The apparatus according to claim 5, wherein said controller is configured to transfer said predetermined value from a storage element to said address translation unit in response to said computer executable instruction.

7. The apparatus according to claim 6, wherein said storage element comprises a register.

8. The apparatus according to claim 5, wherein said controller comprises one or more microcode instructions configured to execute said computer executable instruction.

9. The apparatus according to claim 1, wherein said address translation unit comprises one or more adders configured to generate a sum of said predetermined value and one or more most significant bits of said one or more addresses according to a predetermined modulus.

10. A method for associating a plurality of memory banks with one or more modules comprising the steps of:
    retrieving a predetermined value in response to a computer executable instruction;
    receiving an address from said one or more modules;
    modifying said address in response to said predetermined value; and
    presenting said modified address to a memory comprising said plurality of memory banks.

11. The method according to claim 10, wherein:
    said computer executable instruction is configured to retrieve said predetermined value from a storage location.

12. The method according to claim 11, wherein said storage location comprises a register of a digital signal processor.

13. The method according to claim 11, further comprising:
    storing said predetermined value in said storage location prior to executing said computer executable instruction.

14. The method according to claim 13, further comprising:
    storing a different predetermined value for each of a plurality of time slots.

15. The method according to claim 10, wherein said address modifying step comprises:
    generating a sum of said predetermined value and each of said one or more addresses; and
    applying a predetermined modulus to said sum.

16. The method according to claim 10, wherein said address is modified by a different predetermined value during each of a plurality of time slots.

17. A digital signal processor configured to execute one or more computer executable instructions, said computer executable instructions comprising an instruction configured to retrieve a predetermined value from a storage location, wherein one or more addresses generated by one or more modules to access a plurality of memory banks are modified in response to said predetermined value.

18. The digital signal processor according to claim 17, wherein said one or more modules performs operations for a pipeline stage of a digital signal processing operation.

19. The digital signal processor according to claim 17, wherein said plurality of memory banks are rotated among said one or more modules in response to said instruction configured to retrieve a predetermined value from a storage location.

20. The digital signal processor according to claim 17, wherein each of said one or more modules generates said one or more addresses independently of which of said plurality of memory banks each of said one or more modules is accessing.

* * * * *